(No Model.)
S. H. FISH.
BILL AND LETTER FILE.
No. 294,214. Patented Feb. 26, 1884.
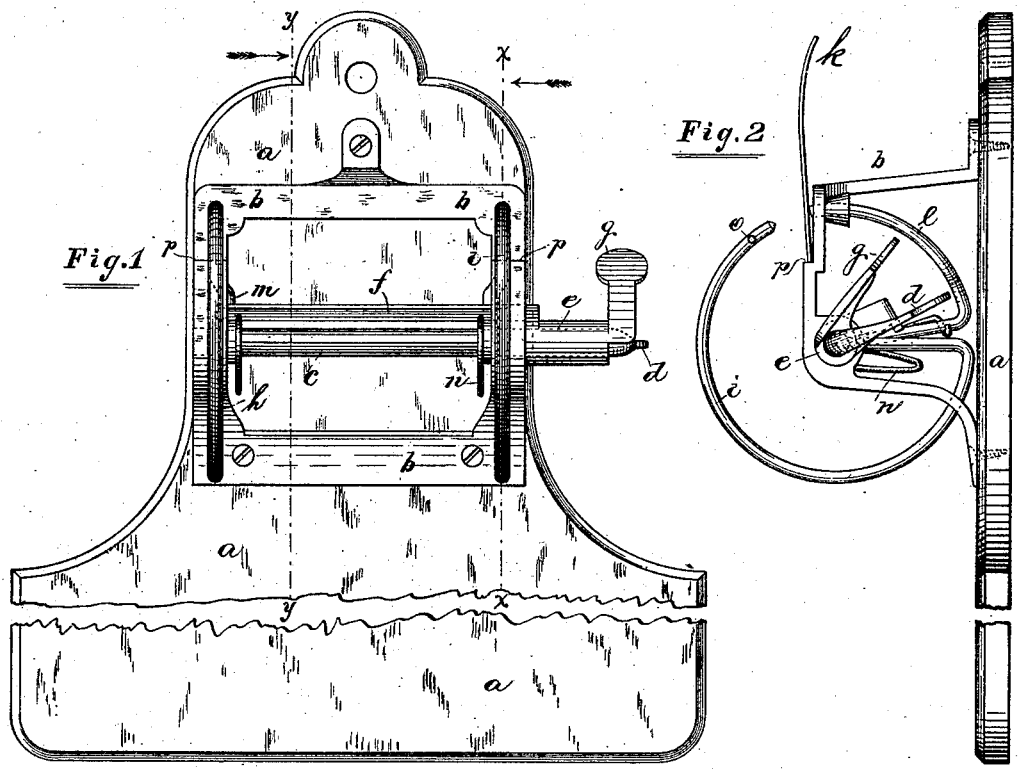
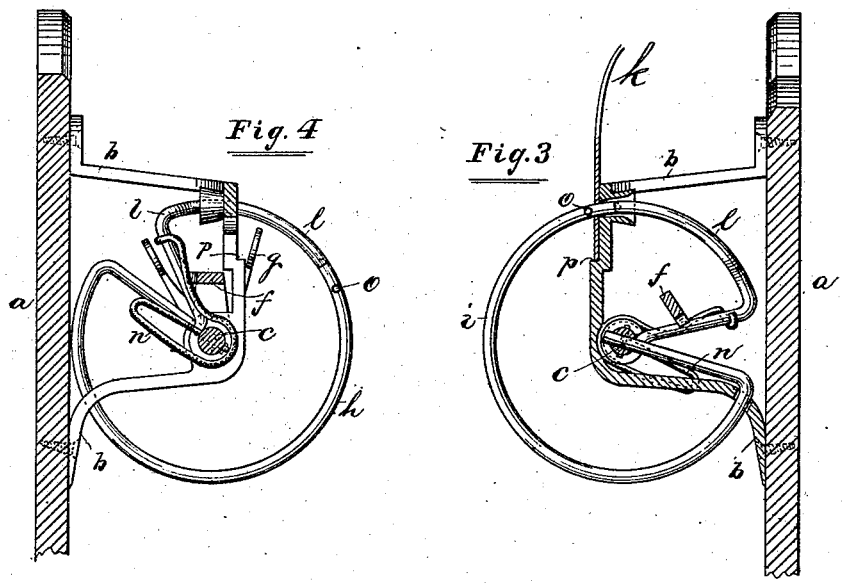
Witnesses,
Henry Frankfurter
W. S. Baker.
Inventor.
Samuel H. Fish,
per George R. Barton
Attorney.

UNITED STATES PATENT OFFICE.

SAMUEL H. FISH, OF HINSDALE, ILLINOIS.

BILL AND LETTER FILE.

SPECIFICATION forming part of Letters Patent No. 294,214, dated February 26, 1884.

Application filed August 20, 1883. (No model.)

*To all whom it may concern:*

Be it known that I, SAMUEL H. FISH, a citizen of the United States, residing at Hinsdale, in the county of Du Page and State of Illinois, have invented a certain new and useful Improvement in Bill and Letter Files, of which the following is a full, clear, concise, and exact description, reference being had to the accompanying drawings, forming a part of this specification.

My invention relates to bill and letter files; and it consists of two hooks mounted on a shaft and so connected with the frame which carries said shaft and the other mechanism that the hooks, which consist each of two wires in the form of a ring, may be turned with the shaft a determinate distance, separated so as to receive the paper between the two parts of each of the rings, and then turned by the crank so as to pierce the paper. I provide springs upon the rings, which bring them together automatically upon the paper. The frame or casting which carries the other parts of my file is provided with holes, which serve as guides for the rings, two of these holes also serving as dies. A sleeve provided with an arm and finger-piece is mounted on the shaft, preferably between the thumb-piece or crank of the shaft and the frame. This sleeve may be turned a determinate distance upon the shaft. The arm provided upon the sleeve extends across the frame parallel to the shaft. One end of one of the two pieces of each of the two rings is fixed to the shaft, while the ends of the other of the two pieces, by which they are attached to the shaft, instead of being fixed rigidly thereto, are simply bent about the shaft. One part of each ring or hook is thus fixed to the shaft, while the other part may turn for a limited distance thereon. The arm is so connected with each of the rings that by pinching together the finger and thumb pieces of the shaft and sleeve, respectively, the rings may be opened to receive the paper, as before mentioned. I provide a guide upon the frame, so that the different bills or letters may be punched at a given distance from their edges.

In the accompanying drawings I have illustrated my invention.

Figure 1 is a front elevation of my device in position against the wall. Fig. 2 is an end elevation thereof, showing a bill inserted in the gage. Fig. 3 is a sectional view thereof upon line $x\,x$ of Fig. 1. Fig. 4 is a view as seen from section $y\,y$, Fig. 1.

Like parts are indicated by similar letters of reference throughout the several views.

The board or tablet $a$ supports the frame or casting $b$, which is secured thereto, preferably by means of three screws, as shown. The shaft $c$ is supported by suitable bearings in the frame, and is provided with the crank or thumb-piece $d$. Upon this shaft, preferably between the thumb-piece and the frame, is mounted the sleeve $e$. The arm $f$ extends from the sleeve across the frame, inside the rings, and preferably rests against that part of each of the rings which is movable upon the shaft. The sleeve is also provided with a crank or finger-piece, $g$. The portions $h\,i$ of the rings or hooks are attached rigidly to the shaft $c$, as shown clearly in Fig. 3. The parts of the rings opposite pieces $h$ and $i$, respectively, are simply bent about the shaft, and may be moved thereon a determinate distance. Thus in Figs. 3 and 4 the piece $l$ is simply bent about the shaft. By taking hold of thumb and finger pieces $d\,g$ the rings may be opened to receive the paper $k$. This is clearly shown in Fig. 2. The springs $m\,n$ tend to hold the parts of the different rings together. The tension of these springs is easily overcome by pinching the cranks $d\,g$ together. The rings are thus opened and allowed to close upon the paper, which is placed in the guide $p$. Then by pulling down upon the crank $d$ the ends of pieces $h\,i$ are forced through the paper, which is resting against the holes or dies in said guide opposite the ends of said pieces $h$ and $i$, respectively. The paper thus pierced by piece $i$ is shown clearly in Fig. 3.

Near the ends of pieces $h\,i$, I provide the holes or eyelets $o$, through which I draw threads before taking the bills or letters from the hooks. I am thus enabled to tie up the bills or letters in the order in which they are placed upon the hook.

I claim as my invention and desire to secure by Letters Patent—

1. The rings attached to the shaft, as described, in combination with the sleeve provided with the arm, the springs, and the cranks, whereby said rings may be opened by hand and closed automatically, substantially as and for the purpose specified.

2. The combination, in a bill and letter file, of the hooks or rings, each composed of two portions, one portion of each hook or ring being fixed to the shaft, and the other portion of each movable thereon a determinate distance, with the sleeve, provided with the arm extending across the frame within the rings or hooks, and means, substantially as described, for opening the hooks and piercing the paper, substantially as and for the purpose specified.

3. The frame provided with the gage, in combination with the hooks, and the shaft provided with the sleeve, mounted between the thumb-piece and the frame, and the arm extending across the frame parallel with the shaft, whereby the hooks may be opened and the bills placed thereon, substantially as and for the purpose specified.

4. The combination, with the hooks or rings, each consisting of two parts, the pointed portion of one of the parts of each ring being provided with an eyelet, $o$, of the shaft provided with the crank, and the sleeve provided with the arm and crank, substantially as specified.

In witness whereof I hereunto subscribe my name this 13th day of August, A. D. 1883.

SAMUEL H. FISH.

Witnesses:
GEORGE P. BARTON,
GUSTAF A. BERGENDAHL.